United States Patent

Freese et al.

(10) Patent No.: US 9,829,219 B2
(45) Date of Patent: Nov. 28, 2017

(54) THERMOELECTRIC ARRANGEMENT FOR USE IN A COOLING SYSTEM OF A MOTOR VEHICLE AND COOLING SYSTEM HAVING SUCH A THERMOELECTRIC ARRANGEMENT

(71) Applicants: Dr. Ing. h.c. F. Porsche Aktiengesellschaft, Stuttgart (DE); Behr GmbH & Co. KG, Stuttgart (DE)

(72) Inventors: Bastian Freese, Ostfildern (DE); Reyk Bienert, Eberdingen (DE); Robert Fleischhacker, Magstadt (DE); Maik-Uwe Zillich, Stuttgart (DE); Martin Knorr, Dresden (DE); Markus Roesler, Bannewitz (DE); Christian Heneka, Karlsruhe (DE); Dirk Neumeister, Stuttgart (DE)

(73) Assignees: Dr. Ing. h.c.f. Porsche Aktiengesellschaft, Stuttgart (DE); MAHLE BEHR GMBH & CO. KG, Stuttgart (DE)

( * ) Notice: Subject to any disclaimer, the term of this patent is extended or adjusted under 35 U.S.C. 154(b) by 46 days.

(21) Appl. No.: 14/132,274

(22) Filed: Dec. 18, 2013

(65) Prior Publication Data
US 2014/0165596 A1   Jun. 19, 2014

(30) Foreign Application Priority Data
Dec. 18, 2012   (DE) .................. 10 2012 112 493

(51) Int. Cl.
*B60H 1/00*   (2006.01)
*F25B 21/02*   (2006.01)
*F25B 25/00*   (2006.01)

(52) U.S. Cl.
CPC ......... *F25B 21/02* (2013.01); *B60H 1/00478* (2013.01); *F25B 25/005* (2013.01); *F25B 2321/0252* (2013.01)

(58) Field of Classification Search
CPC ..... B60H 1/0478; B60H 1/2221; F25B 41/00; F25B 41/003; F25B 41/04; F25B 21/02; F25B 21/04; F25B 25/005; F24F 3/06
(Continued)

(56) References Cited

U.S. PATENT DOCUMENTS 3,236,056 A * 2/1966 Phillips et al. ................. 62/3.61
6,370,903 B1 * 4/2002 Wlech .......................... 62/324.6
(Continued)

FOREIGN PATENT DOCUMENTS

DE   102006042160   3/2008
DE      60319291    2/2009
(Continued)

OTHER PUBLICATIONS

German Patent Application No. 10 2012 112 493—Search Report dated Apr. 26, 2013.

*Primary Examiner* — Jianying Atkisson
*Assistant Examiner* — Antonio R Febles
(74) *Attorney, Agent, or Firm* — Gerald E. Hespos; Michael J. Porco; Matthew T. Hespos

(57) ABSTRACT

A thermoelectric arrangement for use in a cooling system (4, 6) of a motor vehicle has a thermocouple (8) with a first, heat-outputting thermal element (10), a second, heat-absorbing thermal element (12) and a conductor element (14) through which current flows. At least two cooling circuits (16, 18, 20) are provided. The first thermal element (10) is arranged in at least one cooling circuit (16, 18, 20), and the second thermal element (12) is arranged in at least one heating circuit (48). The first thermal element (10) is
(Continued)

arranged in a first connecting line (22) that is connected fluidically to the respective cooling circuits (16, 18, 20) via valve arrangements (24, 26; 28, 30; 32, 34) on the input and output sides of the first thermal element (10). A cooling system having such a thermoelectric arrangement also is described.

8 Claims, 2 Drawing Sheets

(58) Field of Classification Search
USPC .................................. 62/3.2–3.7, 79, 335
See application file for complete search history.

(56) References Cited

U.S. PATENT DOCUMENTS

| | | | |
|---|---|---|---|
| 7,284,379 B2 * | 10/2007 | Pham et al. | 62/3.3 |
| 7,380,586 B2 * | 6/2008 | Gawthrop | 165/202 |
| 7,743,614 B2 * | 6/2010 | Goenka et al. | 62/3.3 |
| 7,779,639 B2 * | 8/2010 | Goenka | 62/3.61 |
| 9,038,400 B2 * | 5/2015 | Goenka | 62/3.61 |
| 2003/0188538 A1 * | 10/2003 | Chu et al. | 62/3.2 |
| 2006/0225441 A1 | 10/2006 | Goenka et al. | |
| 2010/0108290 A1 * | 5/2010 | Maxwell | 165/62 |
| 2010/0155018 A1 | 6/2010 | Goenka et al. | |
| 2011/0100021 A1 | 5/2011 | Akiyama et al. | |
| 2011/0252821 A1 * | 10/2011 | Miglio | 62/238.7 |

FOREIGN PATENT DOCUMENTS

| | | |
|---|---|---|
| DE | 102010026601 | 1/2012 |
| WO | WO 2006046590 A1 * | 5/2006 |
| WO | WO 2012120603 A1 * | 9/2012 |

* cited by examiner

THERMOELECTRIC ARRANGEMENT FOR USE IN A COOLING SYSTEM OF A MOTOR VEHICLE AND COOLING SYSTEM HAVING SUCH A THERMOELECTRIC ARRANGEMENT

CROSS REFERENCE TO RELATED APPLICATION

This application claims priority under 35 USC 119 to German Patent Appl. No. 10 2012 112 493.0 filed on Dec. 18, 2012, the entire disclosure of which is incorporated herein by reference.

BACKGROUND

1. Field of the Invention

The invention relates to a thermoelectric arrangement for use in a cooling system of a motor vehicle having a thermocouple which has a first, heat-outputting thermal element, a second, heat-absorbing thermal element and a conductor element through which current flows, wherein the first thermal element is arranged in at least one cooling circuit, and the second thermal element is arranged in at least one heating circuit. Furthermore, the invention relates to a cooling system having such a thermoelectric arrangement.

2. Description of the Related Art

Thermoelectric arrangements for use in cooling systems of motor vehicles are sufficiently known from the prior art. For example, EP 2 292 454 A1 therefore discloses a cooling circuit for an electric motor having a thermoelectric arrangement which has a Peltier element. As an option for cooling an energy accumulator, a further thermoelectric arrangement can be provided with a further Peltier element. It should be clear that using a relatively large number of such thermoelectric arrangements gives rise to a high level of expenditure on manufacture, which relates both to assembly and to costs.

The objective of the invention is therefore to make available a thermoelectric arrangement or a cooling system with such a thermoelectric arrangement which avoids the abovementioned disadvantage.

SUMMARY OF THE INVENTION

This object is achieved in that at least two cooling circuits are provided, wherein a first connecting line is provided in which the first thermal element is arranged and which is fluidically connected to the respective cooling circuits via valve arrangements on the input and output sides of the first thermal element. This easily and cost-effectively provides the possibility of using a thermoelectric arrangement for various cooling circuits. It is also, of course, possible to connect a plurality of heating circuits to such a thermoelectric arrangement in the same way.

In one particularly advantageous embodiment, each cooling circuit is connected upstream of the first thermal element to a 2/2-way valve via a first connecting line, and downstream of the first thermal element a second connecting line is connected to a 3/2-way valve arranged in the cooling circuit. As a result, it is easily possible to implement a flow through the first thermal element, but also a bypass of the first thermal element, for each cooling circuit.

It is also advantageous if the heating circuit has a second connecting line to the second thermal element, a bypass line is provided which branches off from the second connecting line upstream of the second thermal element and is connected downstream of the second thermal element to the second connecting line via a 3/2-way valve.

The thermocouple is particularly advantageously embodied as a Peltier element.

The object is also achieved by means of a cooling system having such a thermoelectric arrangement, wherein a first cooling circuit for cooling an electric drive and, if appropriate, assigned power electronics is provided, wherein a second cooling circuit for cooling a high-voltage battery is provided, and wherein a third cooling circuit for exchanging heat with external air is provided. In this context it is advantageously possible for the first cooling circuit to be connected downstream of the thermoelectric arrangement to a cooling circuit via a valve arrangement. This ensures that even in the case of inadequate cooling power of the thermoelectric arrangement the electric drive and, if appropriate, the assigned power electronics can be sufficiently cooled.

The heating circuit can advantageously have a heat exchanger for heating a passenger compartment. In this case it is advantageous, for example in the case of extremely low external temperatures, if the heating circuit has a high-voltage supplementary heater.

The invention will be explained in more detail below with reference to the drawings.

DETAILED DESCRIPTION OF THE PREFERRED EMBODIMENTS

Figure 1:
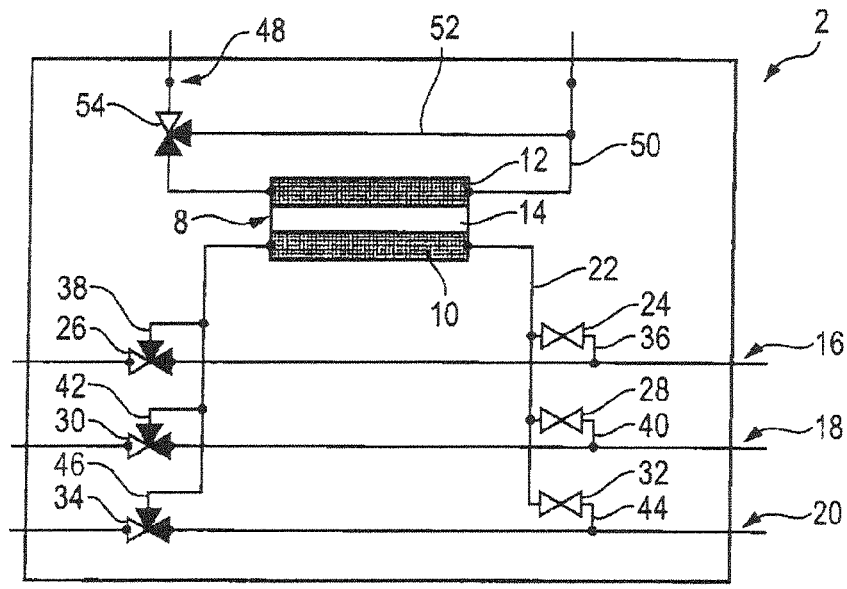
FIG. 1 shows a schematic illustration of a thermoelectric arrangement according to the invention.

FIG. 1 shows a schematic illustration of a thermoelectric arrangement 2 according to the invention for use in a cooling system 4 or 6 of a motor vehicle (not illustrated further). The thermoelectric arrangement 2 according to the invention has a thermocouple 8 which has a first, heat-outputting thermal element 10, a second, heat-absorbing thermal element 12 and a conductor element 14 which is arranged between them and through which current flows. In the present exemplary embodiment, the thermocouple 8 is embodied as a Peltier element. Furthermore, power components of a first cooling circuit 16, of a second cooling circuit 18 and of a third cooling circuit 20 are provided. The first thermal element 10 is then integrated into the cooling circuits 16, 18, 20 in such a way that a connecting line 22 is provided which is connected to the respective cooling circuits 16, 18, 20 via valve arrangements 24, 26; 28, 30; 32, 34 upstream and downstream of the first thermal element 10 via respective first and second connecting lines 36, 38; 40, 42; 44, 46. Therefore, for example, a first connecting line 36, which is connected to the first connecting line 22 via a 2/2-way valve 24, branches off from the first cooling circuit 16, with the result that the first cooling circuit 16 can be fluidically connected in this form to the first thermal element 10. In turn, a second connecting line 38 branches off from the connecting line 22 downstream of the first thermal element 10, wherein this connecting line 38 is in turn connected to the cooling circuit 16 via a 3/2-way valve. In this way it is possible to provide for the first thermal element 10 in the respective cooling circuit 16, 18, 20 to be flowed through in a way appropriate for demand. The connection of the second cooling circuit 18 and of the third cooling circuit 20 takes place correspondingly.

The second thermal element 12 is connected into a heating circuit 48 which serves, for example, for use for the passenger compartment. For this purpose, in the present exemplary embodiment a second connecting line 50 is provided from which a bypass line 52 branches off upstream of the second thermal element 12, said bypass line 52 being connected to the connecting line 50 downstream of the second thermal element 12 via a 3/2-way valve 54. This makes it possible for the thermocouple 8 in the heating circuit 48 to be easily bypassed.

Figure 2:
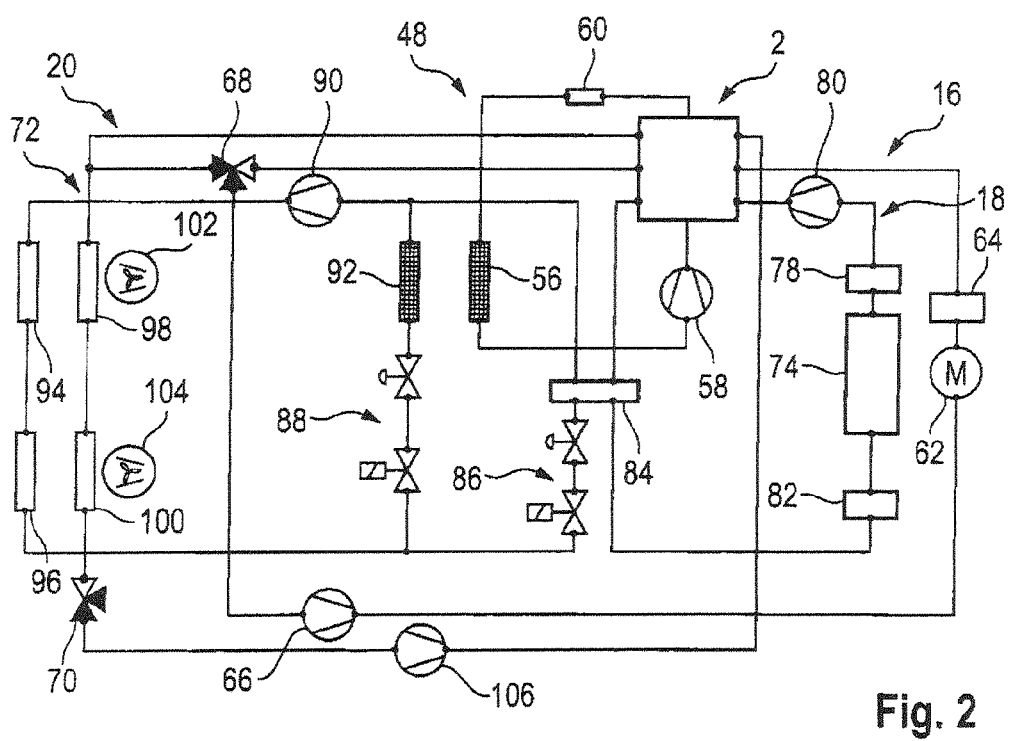
FIG. 2 shows a schematic illustration of a cooling system according to the invention with the thermoelectric arrangement from FIG. 1.

FIG. 2 then shows a first embodiment of a cooling system 4 with the thermoelectric arrangement 2 according to the invention. In the present exemplary embodiment, the heating circuit 48 has, in a known fashion, a heating-type heat exchanger 56 and a first fluid pump 58. Furthermore, in a known fashion, a high-voltage supplementary heater 60 is provided in order to ensure sufficient heating performance at extremely low external temperatures.

The first cooling circuit 16 serves to cool an electric drive 62 and the assigned power electronics 64. This circuit also has in a known fashion a second fluid pump 66. In order to be able to ensure sufficient cooling of the electric drive 62 and of the power electronics 64, this first cooling circuit 16 is connected in the present exemplary embodiment to the third cooling circuit 20 via two 3/2-way valves 68, 70. The second cooling circuit 18 serves to cool a high-voltage battery 74 and a charging device 78. This cooling circuit also has in a known fashion a third fluid pump 80. Furthermore, this second cooling circuit 18 has a high-voltage supplementary heater 82 which, given particularly low external temperatures, can ensure a minimum temperature for the high-voltage battery 74. In a known fashion, this second cooling circuit 18 is connected via a chiller 84 to a fourth cooling circuit 72. This fourth cooling circuit 72 can also be described as a refrigerating circuit and has, in particular, valve arrangements 86, 88, known per se, a fourth fluid pump/compressor 90, a vaporizer 92 and condensers 94, 96. Furthermore, a third cooling circuit 20 is provided which, as already described, is connected to the first cooling circuit 16. The third cooling circuit 20 has in the present exemplary embodiment two high-temperature radiators 98, 100 as well as assigned fans 102, 104 which are assigned in a known fashion to the engine cooling circuit system and provide heat exchange with the external air. This cooling circuit 20 also has a fifth fluid pump 106.

Figure 3:
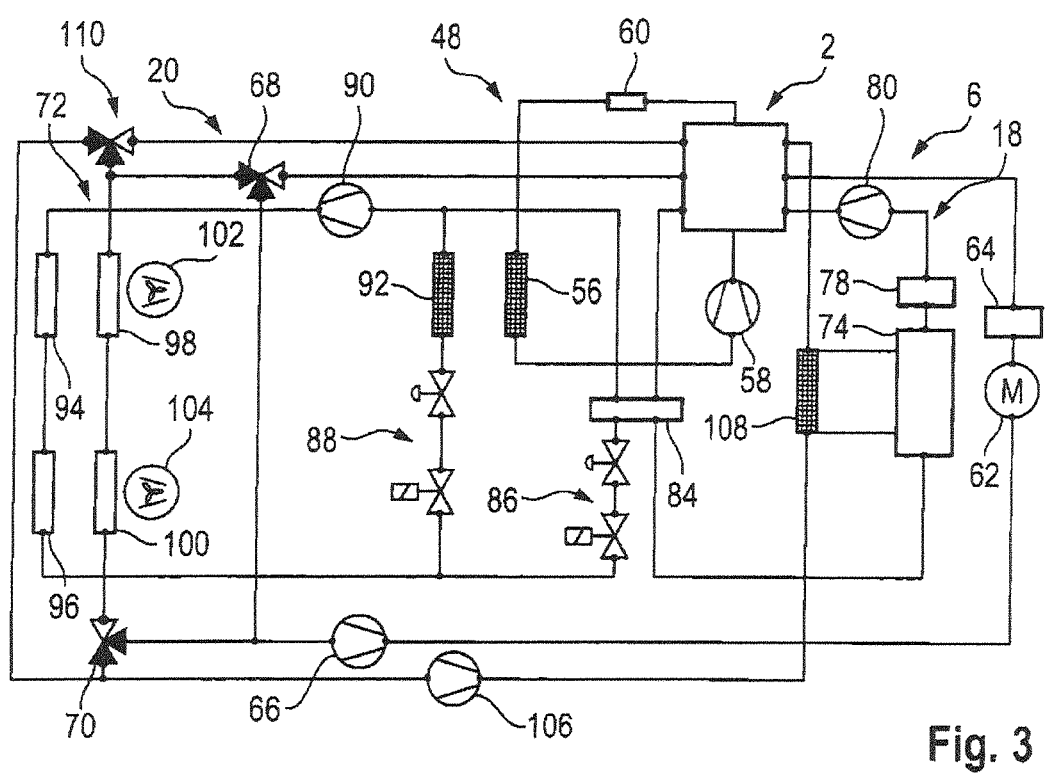
FIG. 3 shows an alternative embodiment to the cooling system according to the invention in FIG. 2.

FIG. 3 then shows in a schematic view a slightly modified cooling system 6 with the thermoelectric arrangement 2 according to the invention. Details are given below only on the differences with respect to the cooling system 4 already described. Essentially, the high-voltage supplementary heater 82 in the cooling system 6 was omitted from FIG. 2 and the possibility of recovering heat via a heat exchanger 108 arranged in the third cooling circuit 20 was provided. So that such recovery of heat can be implemented in a flexible way a bypass of the high-temperature radiators 98, 100 is provided in the third cooling circuit 20 via a valve arrangement 110.

It should be clear that the illustrated cooling systems merely indicate application possibilities for the thermoelectric arrangement 2 according to the invention. Further refinements of the cooling systems are conceivable.

What is claimed is:

1. A thermoelectric arrangement for a cooling system (4, 6) of a motor vehicle comprising: a thermocouple (8) with a first, heat-outputting thermal element (10) having a fluid inlet and a fluid outlet, a second, heat-absorbing thermal element (12) having a fluid inlet and a fluid outlet and a conductor element (14) through which current flows, the second thermal element (12) being arranged in at least one heating circuit (48), a fluid inlet line (22) that is fluidically connected to the inlet of the first thermal element (10) and a fluid outlet line that is fluidically connected to the fluid outlet of the first thermal element (10), at least first and second cooling circuits (16, 18, 20), first and second upstream connecting lines (36, 40) connecting the respective first and second cooling circuits (16, 18) to the fluid inlet line (22), first and second upstream valve arrangements (24; 28; 32) in the respective first and second upstream connecting lines (36, 40), first and second downstream connecting lines (38, 40) connecting the fluid outlet line from the first thermal element (10) respectively to the first and second cooling circuits (16, 18), and first and second downstream valve arrangements (26; 30; 34) in the respective downstream connecting lines, wherein the respective upstream and downstream valve arrangements (24, 26; 28, 30; 32, 34) are configured so that, in first positions of the respective upstream and downstream valve arrangements (24, 26; 28, 30; 32, 34), the corresponding cooling circuit (16, 18, 20) is in communication with the first thermal element (10) and in second positions of the respective upstream and downstream valve arrangements (24, 26; 28, 30; 32, 34), the corresponding cooling circuit (16, 18, 20) bypasses the first thermal element (10).

2. The thermoelectric arrangement of claim 1, wherein each of the upstream valve arrangements (24, 28, 32) is a 2/2-way valve (24, 28, 32) incorporated into the respective upstream connecting line (36, 40, 44), and each of the downstream valve arrangements (26, 30, 34) is a 3/2-way valve (26, 30, 34) arranged in the downstream connecting line (38, 42, 46) at the respective cooling circuit (16, 18, 20).

3. The thermoelectric arrangement of claim 1, wherein the heating circuit (48) has a heating-type heat exchanger (56), a second connecting line (50) with an upstream section extending from the heating-type heat exchanger (56) to an input side of the second thermal element (12) and a downstream section extending from an output side of the second thermal element (12) to the heating-type heat exchanger (56), a bypass line (52) connecting the upstream section of the second connecting line (50) to the downstream section of the second connecting line (50), and a 3/2-way valve (54) incorporated into the bypass line (52) and the second connecting line (50) so that in a first operative position, the 3/2-way valve (54) directs a flow through the second thermal element (12) and in a second operative position, the 3/2-way valve (54) causes a bypass of the second thermal element (12).

4. The thermoelectric arrangement of claim 1, wherein the thermocouple (8) is a Peltier element.

5. A cooling system comprising the thermoelectric arrangement (2) of claim 1, wherein each of the cooling circuits communicates with at least one component of the vehicle that requires cooling, the first cooling circuit (16) cooling an electric drive (62) and power electronics (64), the second cooling circuit (18) cooling a high-voltage battery (74), and further comprising a third cooling circuit (20) that exchanges heat with external air.

6. The cooling system of claim 5, further comprising a valve arrangement (68, 70) connecting the first cooling circuit (16) to the third cooling circuit (20) at a position downstream of the thermoelectric arrangement (2) and upstream of the at least one component of the vehicle that requires cooling.

7. The cooling system of claim 5, wherein the heating circuit (48) has a heat exchanger (56) for heating a passenger compartment.

8. The cooling system of claim 7, wherein the heating circuit (48) has an electrical supplementary heater (60).

* * * * *